United States Patent
Ham et al.

(10) Patent No.: US 7,424,313 B2
(45) Date of Patent: Sep. 9, 2008

(54) PUBLIC LAND MOBILE NETWORK/PRIVATE WIRELESS NETWORK-INTEGRATED SERVICE NETWORK AND SYSTEM FOR THE SAME

(75) Inventors: Young-Cheol Ham, Suwon-shi (KR); Gui-Jung Lee, Yongin-shi (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 112 days.

(21) Appl. No.: 10/298,637

(22) Filed: Nov. 19, 2002

(65) Prior Publication Data
US 2003/0100342 A1 May 29, 2003

(30) Foreign Application Priority Data
Nov. 28, 2001 (KR) ............................... 2001-74585

(51) Int. Cl.
H04B 1/38 (2006.01)
(52) U.S. Cl. .................... 455/560; 455/554.1; 455/555; 455/462; 455/426.1; 455/465; 379/220.01; 379/225; 370/328; 370/329; 370/400
(58) Field of Classification Search ................ 455/445, 455/426.1–426.2, 462, 465, 554.1–555, 432.1, 455/433, 422.1, 560–561; 370/328–329, 370/310, 351–353, 335, 340, 400–401; 379/137, 379/220.01, 221.01–221.09, 221.15, 219, 379/234, 230–231
See application file for complete search history.

(56) References Cited

U.S. PATENT DOCUMENTS

| | | | | |
|---|---|---|---|---|
| 1,895 A | * | 12/1840 | Hoffpauir et al. ....... | 408/115 R |
| 4,955,050 A | * | 9/1990 | Yamauchi .................. | 455/555 |
| 5,303,287 A | * | 4/1994 | Laborde ................... | 455/426.1 |
| 5,406,615 A | * | 4/1995 | Miller et al. ............. | 455/552.1 |
| 5,448,619 A | * | 9/1995 | Evans et al. .............. | 455/426.1 |
| 5,459,727 A | * | 10/1995 | Vannucci .................... | 370/332 |
| 5,537,610 A | * | 7/1996 | Mauger et al. ............. | 370/328 |
| 5,761,195 A | * | 6/1998 | Lu et al. ..................... | 370/329 |
| 5,818,824 A | * | 10/1998 | Lu et al. ..................... | 370/328 |
| 5,870,673 A | | 2/1999 | Haartsen | |

(Continued)

FOREIGN PATENT DOCUMENTS

| | | |
|---|---|---|
| CN | 96190745.2 | 8/1997 |
| CN | 99101269.0 | 12/1999 |
| CN | 01139981.3 | 7/2002 |
| WO | WO 96/35309 A1 | 11/1996 |
| WO | WO 01/41478 A1 | 6/2001 |
| WO | WO 200141478 A1 * | 6/2001 |

OTHER PUBLICATIONS

Bur Goode, "Voice Over Internet Protocol (VoIP)" in IEEE, vol.90, No. 9, p. 1495-1517, Sep. 2002.

(Continued)

*Primary Examiner*—Sharad Rampuria
(74) *Attorney, Agent, or Firm*—Robert E. Bushnell, Esq.

(57) ABSTRACT

A public land mobile network (PLMN)/private wireless network-integrated service network and a system for the service network. The service network according to the present invention can interwork with any PLMN with no dependence on an upper system. In the present invention, there is no need for a public BSC and a separate private BSC. The novel BSC handles both public and private data and voice calls placed from or placed to a mobile station or terminal. The novel BSC enables a wireless phone or terminal to place and receive calls using either the public communications network or the private communications network. Thus, the need for a redundant private BSC is eliminated while providing the diversity of services to mobile stations.

13 Claims, 6 Drawing Sheets

U.S. PATENT DOCUMENTS

| | | | | |
|---|---|---|---|---|
| 5,887,256 | A * | 3/1999 | Lu et al. | 455/426.1 |
| 5,999,813 | A * | 12/1999 | Lu et al. | 455/435.2 |
| 6,058,302 | A * | 5/2000 | Westerberg | 455/411 |
| 6,061,346 | A | 5/2000 | Nordman | |
| 6,070,081 | A * | 5/2000 | Takahashi et al. | 455/463 |
| 6,073,029 | A * | 6/2000 | Smith et al. | 455/555 |
| 6,112,088 | A | 8/2000 | Haartsen | |
| 6,130,883 | A * | 10/2000 | Spear et al. | 370/328 |
| 6,141,562 | A * | 10/2000 | Eriksson | 455/555 |
| 6,212,395 | B1 * | 4/2001 | Lu et al. | 455/463 |
| 6,275,696 | B1 * | 8/2001 | Paik | 455/426.1 |
| 6,330,244 | B1 * | 12/2001 | Swartz et al. | 370/401 |
| 6,411,632 | B2 | 6/2002 | Lindgren et al. | |
| 6,421,714 | B1 * | 7/2002 | Rai et al. | 709/217 |
| 6,470,081 | B1 * | 10/2002 | Sbisa et al. | 379/221.09 |
| 6,535,732 | B1 * | 3/2003 | McIntosh et al. | 455/445 |
| 6,539,237 | B1 * | 3/2003 | Sayers et al. | 455/555 |
| 6,633,636 | B1 * | 10/2003 | McConnell et al. | 379/220.01 |
| 6,658,259 | B2 * | 12/2003 | McIntosh | 455/462 |
| 6,687,243 | B1 * | 2/2004 | Sayers et al. | 370/356 |
| 6,807,431 | B2 * | 10/2004 | Sayers et al. | 455/555 |
| 6,826,414 | B1 * | 11/2004 | Reynolds et al. | 455/555 |
| 6,829,477 | B1 * | 12/2004 | Lu et al. | 455/426.1 |
| 6,907,268 | B2 * | 6/2005 | Iyer | 455/560 |
| 6,970,719 | B1 * | 11/2005 | McConnell et al. | 455/554.1 |
| 6,985,723 | B2 * | 1/2006 | Kil | 455/426.1 |
| 6,993,359 | B1 * | 1/2006 | Nelakanti et al. | 455/554.1 |
| 6,993,360 | B2 * | 1/2006 | Plahte et al. | 455/555 |
| 2002/0009991 | A1 | 1/2002 | Lu et al. | |
| 2002/0082006 | A1 | 6/2002 | Narvanen et al. | |
| 2002/0112055 | A1 | 8/2002 | Capers et al. | |
| 2002/0193116 | A1 * | 12/2002 | Agrawal et al. | 455/445 |
| 2005/0048967 | A1 * | 3/2005 | Hoglander et al. | 455/426.1 |

OTHER PUBLICATIONS

The Examination Report issued by the Inellectual Property Office of New Zealand dated Dec. 3, 2002.

*Office Action* from the State intellectual Property Office of People's Republic of China issued in Applicant's corresponding Chinese Patent Application No. 03103782.8 (dated Feb. 18, 2005).

*Office Action* from the Japan Patent Office issued in Applicant's corresponding Korean Patent Application No. 2001-0074585 dated Sep. 13, 2005.

* cited by examiner

PUBLIC LAND MOBILE NETWORK/PRIVATE WIRELESS NETWORK-INTEGRATED SERVICE NETWORK AND SYSTEM FOR THE SAME

CLAIM OF PRIORITY

This application claims priority under 35 U.S.C. § 119 to my application entitled "PUBLIC LAND MOBILE NETWORK/PRIVATE WIRELESS NETWORK-INTEGRATED SERVICE NETWORK AND SYSTEM FOR THE SAME", filed in the Korean Industrial Property Office on Nov. 28, 2001 and assigned Serial No. 2001-74585, the contents of which are hereby incorporated by reference.

BACKGROUND OF THE INVENTION

1. Field of the Invention

The present invention relates to a mobile telecommunications service, and more particularly to a mobile telecommunications service network in which there is an interworking between a public land mobile network (PLMN) and a wired/wireless private switched network.

2. Description of the Related Art

Generally, it is impossible for a public land mobile network (PLMN) to interwork with a wired/wireless private network, and subscribers suffer the inconvenience of having to be provided with a mobile telecommunications service only from their registered network, one of the PLMN and the wireless private network. There has been developed a service system in which the PLMN interworks with the wired/wireless private switched network such that the subscriber can be provided with the mobile telecommunications service from either one of the networks with a mobile telecommunications terminal, or a mobile station (MS). Examples of this service system are disclosed in a Patent Laid-open Publication No. 2001-9932 published on Jan. 5, 2001 (entitled "Method for processing in extension terminal terminating call between mobile telecommunications network and private switched network") and an U.S. Patent Laid-open Publication No. 2001-16835 published on Mar. 5, 2001 (entitled "Method for processing in mobile terminal terminating call between mobile telecommunications network and private wireless network").

What is needed is an arrangement where a private network can work with any PLMN. Also, what is needed is to eliminate the need for a public and a private base station controller (i.e., BSC) thus eliminating redundant elements and providing both public and private mobile communications to mobile stations and terminals.

SUMMARY OF THE INVENTION

It is therefore an object of the present invention to provide a PLMN/private wireless network-integrated service network, which can interwork with any PLMN with no dependence on an upper system, and a system for the service network.

It is another object of the present invention to provide a PLMN/private wireless network-integrated service network with no need for a BSC of a PLMN and a private BSC to be separately provided, and a system for the service network.

It is further an object of the present invention to efficiently provide both public and private mobile communication services to mobile stations and terminals for both data calls and voice calls.

These and other objects can be achieved by having a novel public BSC interface to both a public mobile communication system and a private mobile communication system enabling mobile stations and terminals to have access to both public and private mobile communication services. The mobile station or a terminal is in wireless communication with a base transceiver station (i.e., "BTS"). The BTS is in communication with the novel BSC enabling the mobile station to send and receive both voice calls and data calls using either a public network or a private network. The novel BSC and the MSC work together for public voice calls, the BSC and the PBX work together for private voice calls, the BSC and the PSDN work together for public data calls and the BSC and the intranet work together for private data calls. Therefore, the novel BSC has interface circuitry and is connected to each of the MSC, PDSN, PBX and the intranet.

The novel BSC includes two transcoder/MSC link interface boards, one connected to the public MSC via either T1 or E1 connection and the other connected to the private PBX via LAN (or Local Area Network) connection to handle voice calls. The BSC further includes two radio packet interface boards, one connected to the public PSDN and the other connected to the private intranet to handle data calls. The novel BSC further includes a BTS interface board that is connected to the BTS's and a control board. The control board, the BTS interface board, the two transcoder/MSC link interface boards and the two radio packet interface boards are all connected to an inner switch disposed within the MSC. The novel control board disposed within the novel BSC induces a public call process module, a private call process module, a message routing module, a private HLR and a private MSC module. The novel BSC handles public network originating calls (or public calls originating from MS 210), private network originating calls (or private calls originating from MS 210), private network terminating calls (or private calls handled by the private network to MS 210) and public network terminating calls (or calls handled by the public network to MS 210). All of the above calls can be either voice calls or data calls. Depending on the above eight types of calls, the BSC interworks with one of the public MSC, the public PSDN, the private PBX and the private intranet.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
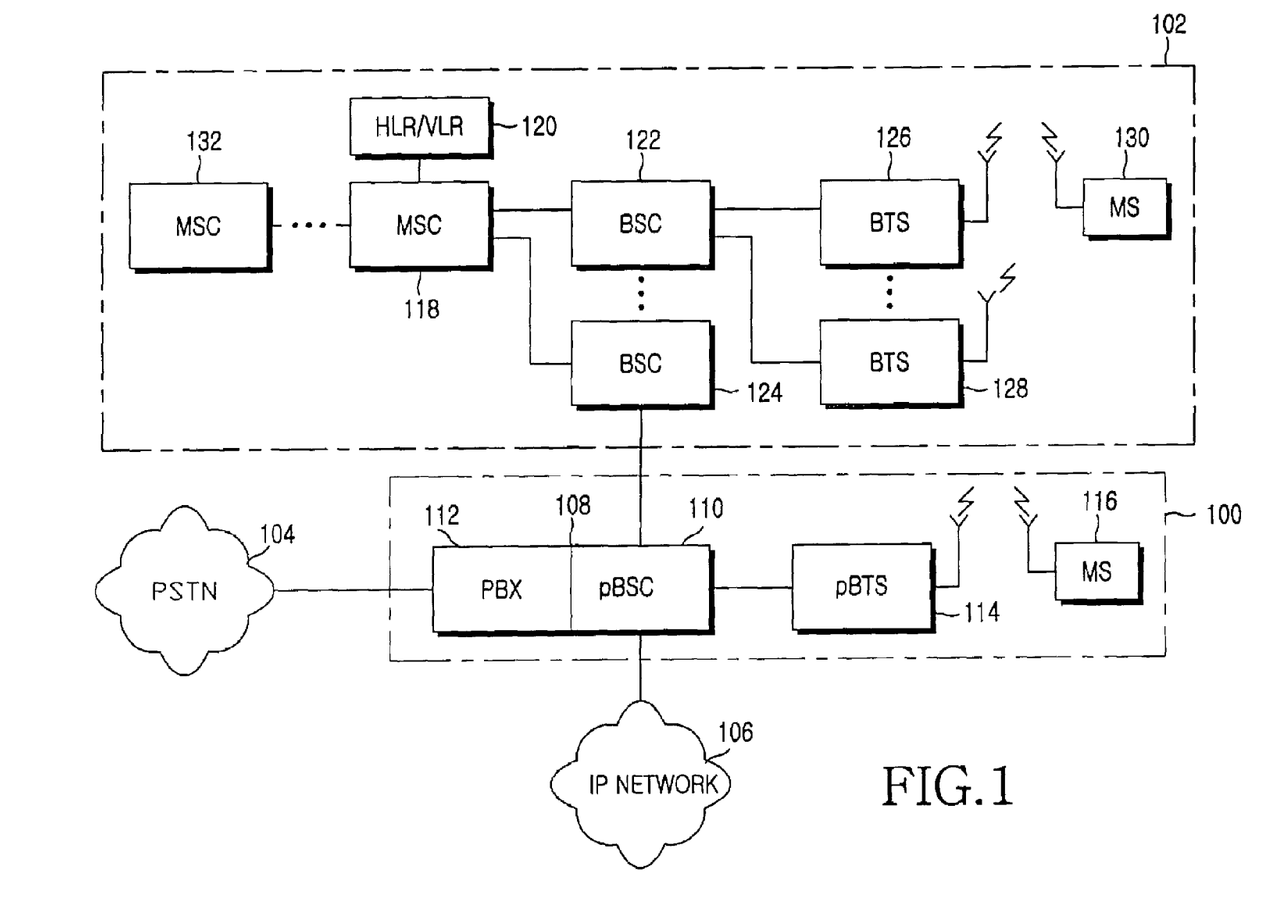
FIG. 1 is a block diagram showing the construction of a service network in which there is an interworking between a public land mobile network (PLMN) and a wired/wireless private switched network.

FIG. 1 is a block diagram showing the construction of a service network in which there is an interworking between the PLMN and the wired/wireless private switched network. As shown in this drawing, the wired/wireless private switched network 100 interworks with the PLMN 102 while being connected to a public switched telephone network (PSTN) 104 and an Internet protocol (IP) network 106. The PLMN 102 includes a plurality of mobile switching centers (MSCs) 118 and 132, a plurality of base station controllers (BSCs) 122 and 124 connected to the MSC 118, and a plurality of base transceiver stations (BTSs) 126 and 128 connected to the BSC 122. With this construction, the PLMN 102 can provide mobile telecommunications services to a mobile station (MS) 130. The MSC 118 is connected to a home location register/visitor location register (HLR/VLR) 120. FIG. 1 simply shows, for the convenience of description, connections between the MSC 118 and the HLR/VLR 120 and between the MSC 118 and the plurality of the BSCs 122 and 124, and connections between the BSC 122 and the plurality of the BTSs 126 and 128. However, although not shown, it will be appreciated that the MSC 132 may have connections to the HLR/VLR 120 and other BSCs, and the BSC 124 may have connections to other BTSs. Further, each of the MSCs 118 and 132 may be connected to the PSTN 104 and the IP network 106 using an interworking function (IWF), although not shown in this drawing.

The wired/wireless private switched network 100 interworking with the PLMN 102 has a structure in which a system 108 has a private branch exchange (PBX) 112 and a private BSC (pBSC) 110 and is connected to a private BTS (pBTS) 114 in order to provide the mobile telecommunications services to an MS 116 registered in the networks 100 and 102. Further, the wired/wireless private switched network 100 is connected to the PSTN 104 through the PBX 112 while being connected to the IP network 106 through the pBSC 110. The functions of the system 108 and pBTS 114 may be performed by an InfoMobile-3G system, which is manufactured and sold by Samsung Electronics Co., Ltd. in Korea.

As well as the BSC 122 and BTS 126 and 128, the BSC 124 and pBSC 110 communicate with each other using interprocessor communications (IPCs) while the MSC 118 and BSCs 122 and 124 communicate with each other according to a standard protocol. On the other hand, the pBSC 110 is connected to the PSTN 104 according to a protocol such as T1, E1, PRI, SS7 or the like, and connected to the IP network 106 according to a transmission control protocol/Internet protocol (TCP/IP) or a voice over Internet protocol (VOIP).

The pBSC 110 interworks with the PBX 112 and PLMN 102 and performs a routing process for a wireless call to the MS 116. In other words, the pBSC 110 performs a routing process with respect to the wireless call via the BSC 124 to the MS 116 if the wireless call is a public network call while performing services via the pBTS 114 if the wireless call is a private network call.

As described above, the pBSC 110 operates between the BSC and the BTS without use of the standard protocol and is dependent on a base station subsystem (BSS), which includes the BSC and BTS, so that it cannot independently interwork with other PLMNs. As described above, the pBSC performs a routing process with respect to the public network call via a public network and, on the other hand, performs a service with respect to a private network call via the pBTS. That is, in order to provide the two similar services, the BSC are the pBSC are both needed, which are respectively upper and lower systems and perform a similar function. Further, a problem may happen in a management of the BTS because the lower private network is managed under the condition that a base station manager (BSM) and the BSC in the PLMN do not recognize the existence of the private network.

Figure 2:
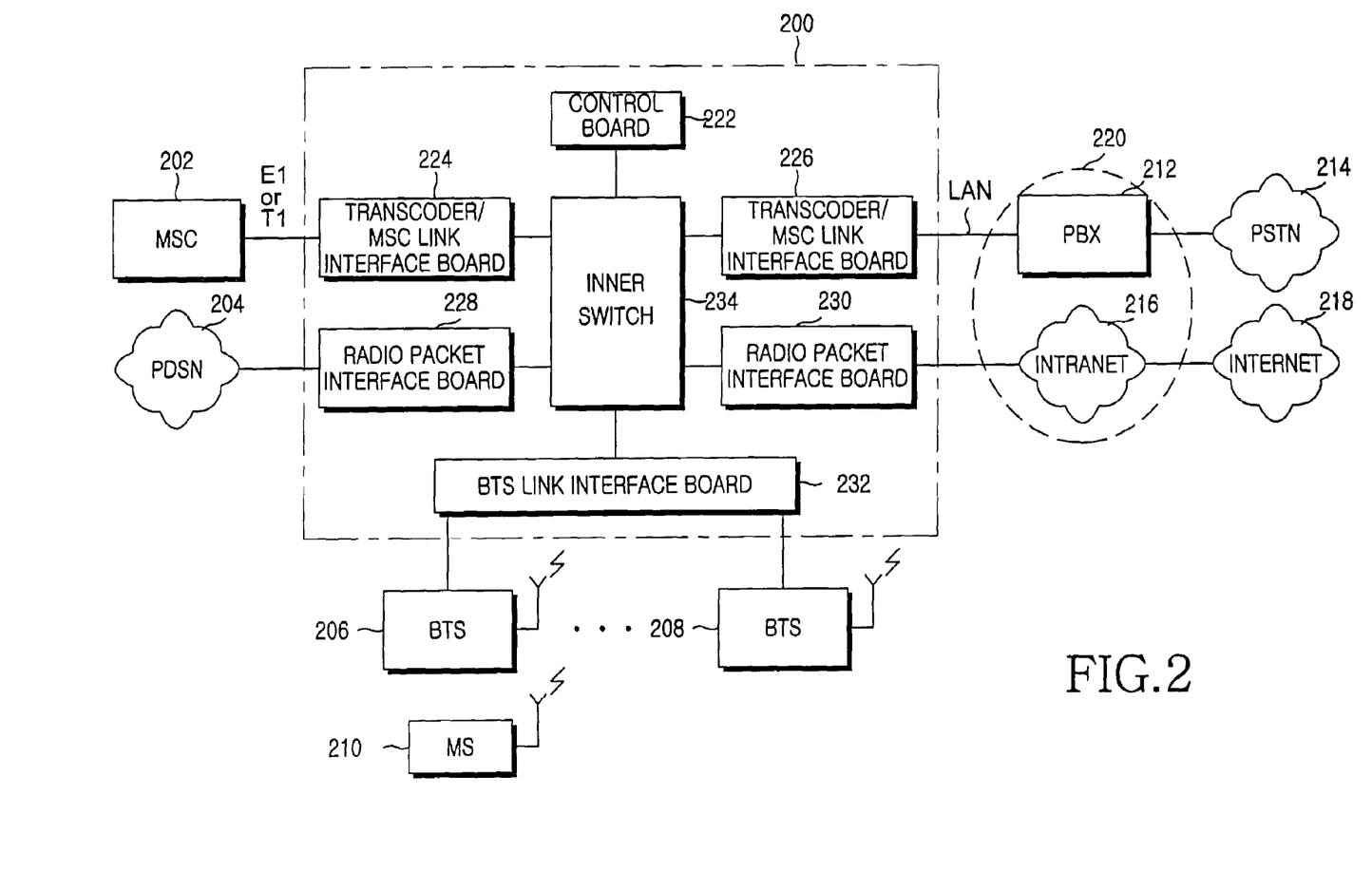
FIG. 2 is a block diagram of a service network integrating a PLMN and a private wireless network and a system for the service network according to a preferred embodiment of the present invention.

FIG. 2 is a block diagram of a service network integrating a PLMN and a private wireless network and a system for the network according to an embodiment of the present invention. In this embodiment, the public land mobile network (PLMN) according to the present invention employs an MSC 202, a BSC 200, BTSs 206 and 208 and an MS 210 similarly to the PLMN 102 illustrated in FIG. 1. The BSC 200 (or PLMN/private wireless network-integrated service system) according to the present invention has a hardware construction of the same type as a BSC of the PLMN 102 illustrated in FIG. 1. However, the PLMN and the BSC 200 in FIG. 2 are configured suitably to the service network in accordance with the present invention. In this embodiment, a system separated from the PLMN 102 in FIG. 1 is not employed. The service network integrates the PLMN 102 and private wireless network in such a manner that the BSC 124 of the PLMN 102 and the pBSC 110 of a private wireless network is integrated to be the BSC 200, in which BSC 124 and pBSC 110 have a similar function with the same hardware form. Namely, the pBSC 110 of the private wireless network is removed, and the BSC 200 interworks with a PBX which had interworked with the pBSC 110. The network as shown in FIG. 2 has functions of the PLMN and has a construction in which the network can be connected to a public data service network (PDSN) 204 through the BSC 200. Further, the network can be connected to a private voice network using the PBX 212 and to a private data network such as an intranet 216. With this construction, the PLMN network can be connected to any private network without dependence on a base stating substation (i.e., a BSS) which is a component of an upper system. The PBX 212 and the intranet 216 in a private area 220 are connected to a PSTN 214 and the Internet 218, respectively.

The BSC 200 is an example of one used in a code division multiple access (CDMA) system, and has the same hardware form as the BSC of the PLMN 102 illustrated in FIG. 1. The BSC 200 according to the present invention includes a control board 222, transcoder/MSC link interface boards 224 and 226, radio packet interface boards 228 and 230, a BTS link interface board 232 and an inner switch 234. The control board 222 functions to process signals of voice and data calls and signals in a traffic state. Both of the transcoder/MSC link interface boards 224 and 226 are system resources and have a voice coder/decoders (VOCODER) to convert PCM data into Qualcomm code-excited linear predictive coding (QCELP) data and vice versa in order to communicate with a BTS channel. Further, each of the transcoder/MSC link interface boards 224 and 226 has an E1 or T1 link to be connected to the MSC 202. Both of the radio packet interface boards 228 and 230 are system resources for data services and perform a radio link protocol (RLP) function. The inner switch 234 functions to enable IPCs (inter-processor communications) among the control board 222, transcoder/MSC link interface boards 224 and 226, radio packet interface boards 228 and 230, BTS link interface board 232 and inner switch 234. The inner switch 234 may be, for example, an asynchronous transfer mode (ATM) switch, a high-level data link control (HDLC) switch or the like.

As described above, the BSC 200 has a similar construction to the BSC of the PLMN 102 illustrated in FIG. 1. However, in the present invention, the transcoder/MSC interface board 224 is connected to the MSC 202 through the E1 or T1 link and is allocated for public use while the transcoder/MSC link interface board 226 is connected to the PBX 212 through a local area network (LAN) and allocated for a local use. Namely, the transcoder/MSC link interface board 224 for public use provides an interface between the BSC 200 and the MSC 202, and the transcoder/MSC link interface board 226 for the local use provides an interface between the BSC 200 and the PBX 212. On the other hand, the radio packet interface board 228 connected to the PDSN 204 is allocated for public use while the radio packet interface board 230 connected to the intranet 216 is allocated for a local use. Namely, the radio packet interface board 228 provides an interface between the BSC 200 and the PDSN 204, and the radio packet interface board 230 provides an interface between the BSC 200 and the intranet 216. The control board 222 controls a public network originating call (a call originating from MS 210 and utilizing the public communications network) from the MS 210 by interworking with the MSC 202 if there is a public network originating call process request transmitted through the BTS 206 or 208 from the MS 210. Further the control board 222 controls a private network originating call (a call originating from MS 210 and utilizing the private communications network) from the MS 210 by interworking with the PBX 212 if there is a private network originating call process request transmitted from the MS 210 through the BTS 206 or 208. On the other hand, the control board 222 controls respective public network and private network terminating call processes (calls to MS 210 utilizing the public communications network and the private communications network, respectively) requested from the MSC 202 and PBX 212, respectively through the BTS 206 or 208 to MS 210. Also, the control board 222 controls public and private terminating call processes requested from MSC 202 and PBX 212, respectively, through the PDSN 204 and the intranet 216, respectively.

Figure 3:
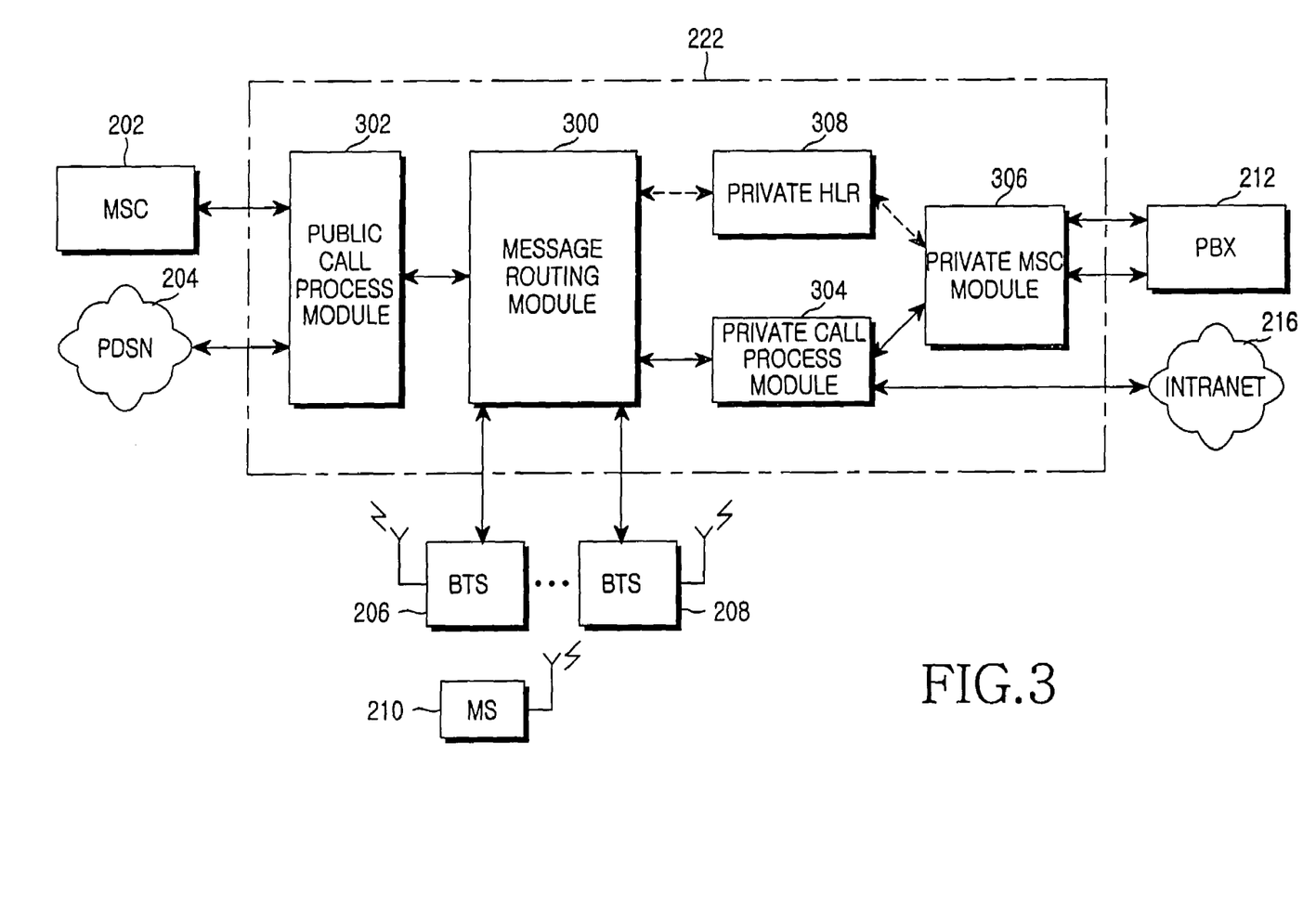
FIG. 3 is a block diagram showing the configuration of control board illustrated in FIG. 2 according to a preferred embodiment of the present invention.

FIG. 3 illustrates a detailed view of control board 222 depicted in FIG. 2 according to the principles of the present invention. In order to perform the call processes as described above, the control board 222 has two types of software that are different from the BSC of the PLMN 102 illustrated in FIG. 1. That is, one is a public call process module 302 for controlling the public call and the other is a private call process module 304 for controlling the private call. The public call process module 302 processes the public network originating and terminating calls by interworking with the MSC 202, and processes a data call through the PDSN 204. The private call process module 304 processes the private network originating and terminating calls by interworking with the PBX 212 through a private MSC module 306, and processes a data call through the intranet 216. A private HLR 308 for the private call process manages information about subscribers registered in a private wireless network. The private MSC module 306 is connected to the private HLR 308 and enables an interworking between the private call process module 304 and the PBX 212. A message routing module 300 is connected to the public call process module 302, private call process module 304 and the private HLR 308. The message routing module 300 performs a routing process through the public call process module 302 with respect to the public network originating and terminating calls from and to the MS 210, respectively. The message routing module 300 also performs a routing process through the private call process module 304 with respect to the private network originating and terminating calls from and to the MS 210, respectively. Further, the message routing module 300 performs a routing process with respect to the data call to provide the data services through the PDSN 204 or the intranet 216.

Figure 4:
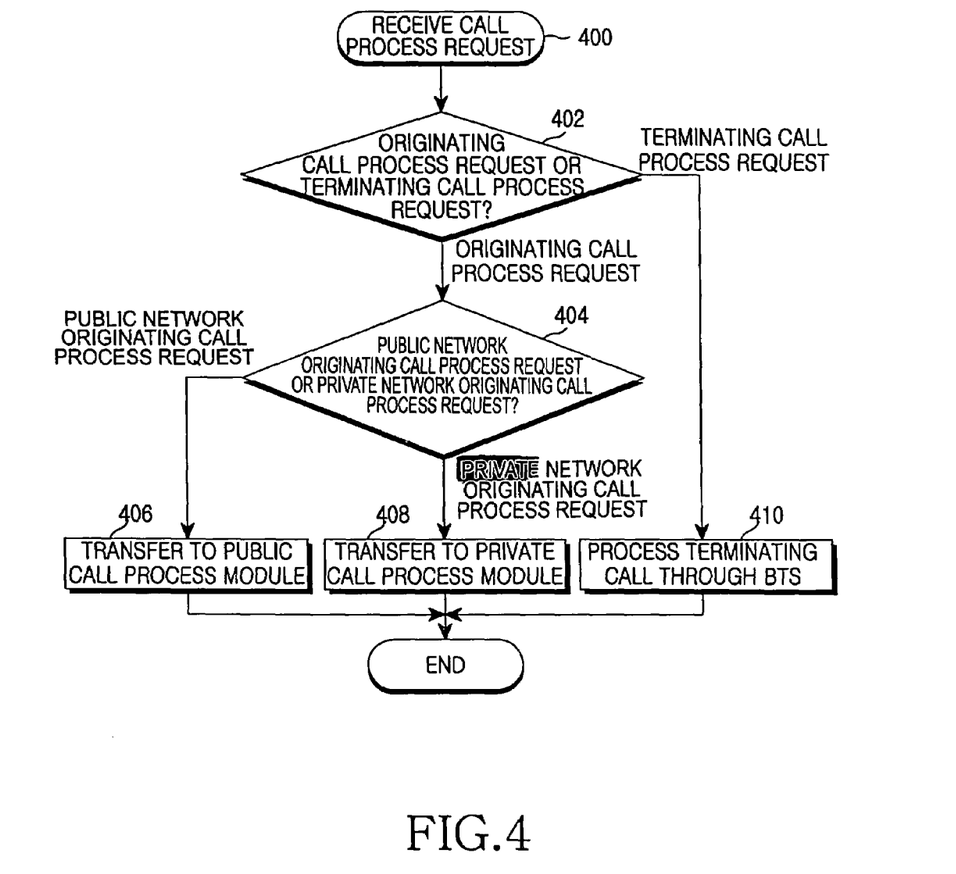
FIGS. 4 through 6 are flow charts respectively illustrating procedures of processing calls according to preferred embodiments of the present invention.
Figure 5:
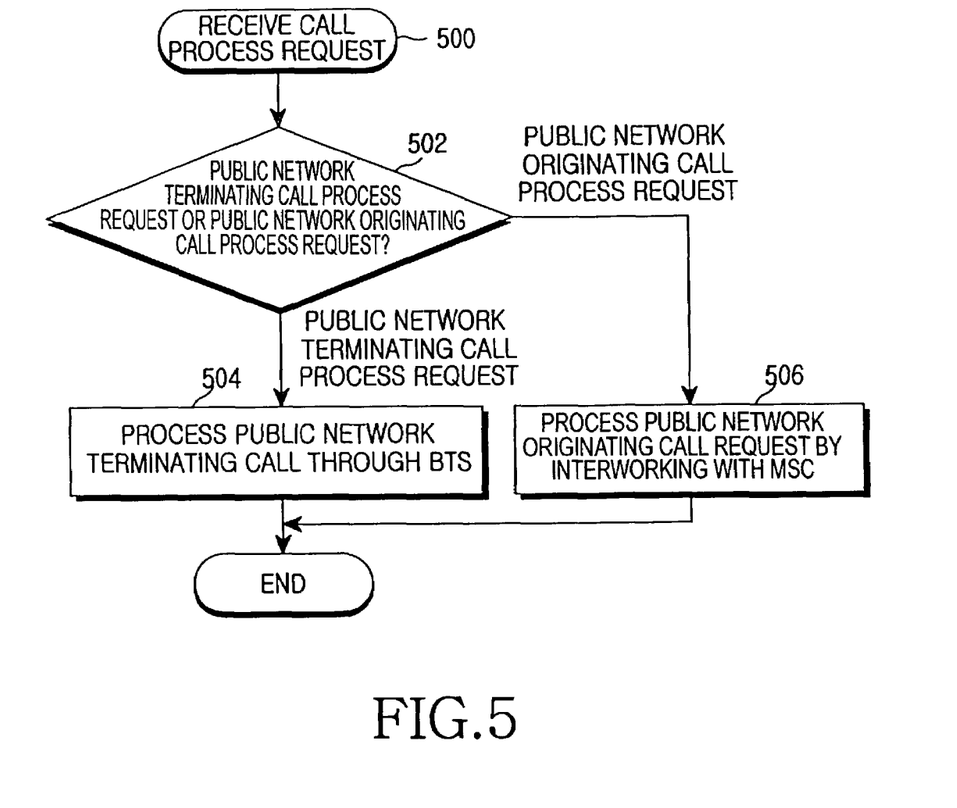
Figure 6:
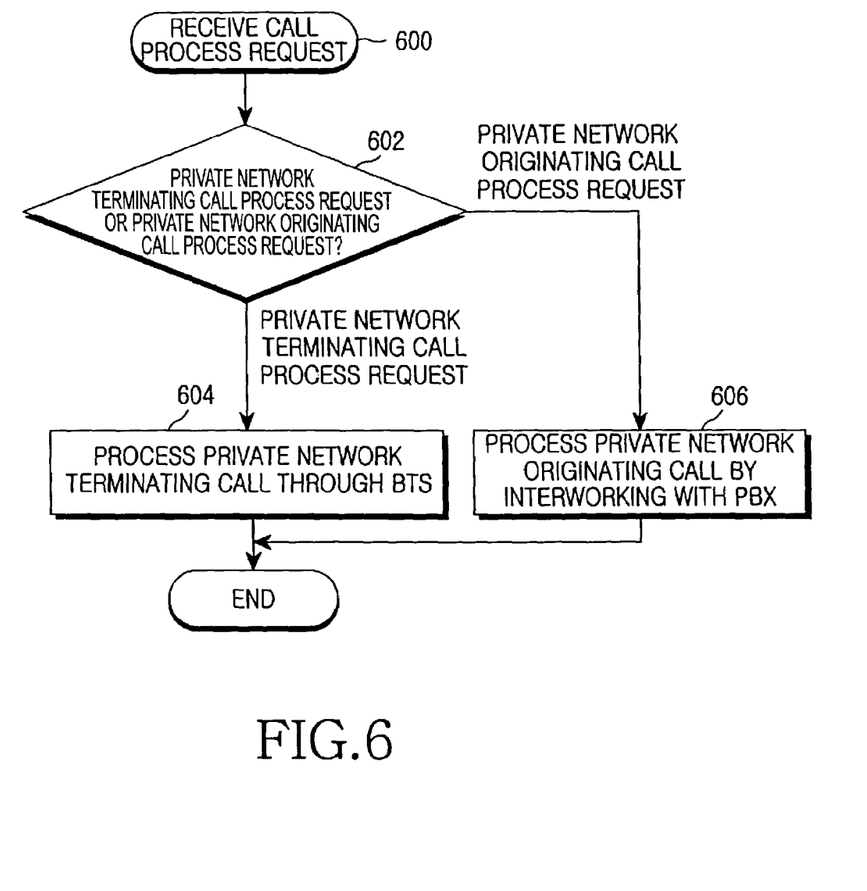

Referring now to FIGS. 4 to 6, call processing procedures will be described below. FIG. 4 is a flow chart illustrating a procedure (S400 to S410) of processing an originating call from the MS 210 or a terminating call to the MS 210 in the message routing module 300. FIG. 5 is a flow chart illustrating a procedure (S500 to S506) of processing an originating call from the MS 210 or a terminating call to the MS 210 in the public call module 302. FIG. 6 is a flow chart illustrating a procedure (S600 to S606) of processing an originating call from the MS 210 or a terminating call to the MS 210 in the private call module 304. First, referring to FIG. 4, if the message routing module 300 receives a public network terminating call process request from the MSC 202 (S400 and S402), it then processes a corresponding public network terminating call to the MS 210 through the BTS 206 or 208 (S410). If the message routing module 300 receives a public network originating call process request from the MS 210 (S400, S402 and S404), it then transfers the received call process request to the public call process module 302 (S406). Upon receiving the call process request from the message routing module 300 (S500 and S502), the public call process module 302 processes a corresponding public network originating call by interworking with the MSC 202 (S506). On the other hand, if the message routing module 300 receives a private network originating call process request from the MS 210, it then analyzes corresponding information in the private HLR 308 and a corresponding calling number (S400, S402 and S404). Then, the message routing module 300 transfers the received the call process request to the private call process module 304 (S408). Upon receiving the private network originating call process request from the message routing module 300 (S600 and S602), the private call process module 304 processes a corresponding private network originating call by interworking with the PBX 212.

On the other hand, if the public call process module 302 receives a public network terminating call process request from the MSC 202 (S500 and S502), it then processes a corresponding public network terminating call to the MS 210 by interworking with the BTS 206 or 208 (S504). If the private call process module 304 receives a private network terminating call process request from the PBX 212 (S600 and S602), it then processes a corresponding private network terminating call to the MS 210 by interworking with the BTS 206 or 208.

Although voice calls have been described in detail, this invention is by no means limited to just voice calls. The scope of this invention also encompasses data calls. For example, a private network originating data call is a call placed by MS 210 to intranet 216. In a private network originating data call, BSC 200 interworks with intranet 216 to connect MS 210 with intranet 216 using only the private communications network. A public network originating data call is a call placed by MS 210 to PDSN 204. In such a call, BSC 200 interworks with PSDN 204 to connect MS 210 with PDSN 204 via the public communications network. A private network terminating data call is a call with the MS 210 being the destination, said call requiring the interworking of BSC 200 with intranet 216 and use of only the private communications network. A public network terminating data call is a call with the MS 210 being the destination, said call requiring the interworking of BSC 200 with PDSN 204 to open communication between PDSN 204 and MS 210 and use of only the public communications network.

As apparent from the above description, according to the present invention, an integrated service network can be configured to be connected to any network without dependence on a BSS which is an upper system using a new BSC in which a BSC of a PLMN and a pBSC of a private wireless network are integrated to be one, which BSC and pBSC have the same hardware form and a similar function. Further, in the present invention, because the new BSC has a function of the pBSC as well, it is possible to manage the network smoothly.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. For example, although data services are provided through the PDSN 204 and the intranet 216 in the above embodiment of the present invention, the data services do not have to be provided. Indeed, various modifications of the described modes for carrying out the invention which are obvious to those skilled in the art are intended to be within the scope of the following claims.

What is claimed is:

1. An apparatus, comprising:
   a mobile switching center (MSC) in a public land mobile network (PLMN), said MSC being part of a public mobile communications network;
   a base transceiver station (BTS);
   a private branch exchange (PBX), said PBX being part of a private mobile communications network; and
   a PLMN/private wireless network-integrated service system connected to the MSC, the BTS and the PBX, said PLMN/private wireless network-integrated service system and said PBX being separately disposed, the service system enabling a mobile station through wireless communication with the BTS to be routed by the service system to connect via the connected MSC or PBX to a corresponding one of said public mobile communications network and said private mobile communications network, said service system enabling voice and data to travel between said mobile station and one of said MSC and said PBX in dependence upon whether the mobile station connects through the public mobile communications network or the private mobile communications network, said service system comprising:
      an inner switch for enabling inter-processor communications (IPCs) between said service system and said MSC, PBX, PDSN and said intranet;
      a public-used transcoder/MSC link interface disposed between said inner switch and said MSC and serving as an interface to said MSC, said public-used transcoder/MSC link interface handling all voice calls to and from said mobile station that use said public mobile communications network;
      a local-used transcoder/MSC link interface disposed between said inner switch and said PBX and serving as an interface to said PBX, said local-used transcoder/MSC link interface handling all voice calls to and from said mobile station that use said private mobile communications network;
      a BTS link interface connected to the BTS; and
      a controller processing all calls to and from the mobile station.

2. The apparatus of claim 1, a LAN cable connecting the service system to said PBX and a T1 or an E1 connection connecting the service system with the MSC.

3. The apparatus of claim 1, the service system being further connected to a public data service network (PDSN) and an intranet to provide data calls using said public mobile communications network and said private mobile communications network, respectively, to and from said mobile station.

4. The apparatus of claim 1, the controller comprises:
   a message routing module performing routing of all calls to or from said mobile station;
   a public call process module processing all public calls to and from said mobile station;
   a private call process module processing all private calls to and from said mobile station;
   a private home location register (HLR) module for managing information about subscribers registered in the private mobile communications network; and
   a private MSC module connected to the private HLR, the private MSC module enabling an interworking with the PBX.

5. The apparatus of claim 3, said service system comprising:
   a public radio packet interface disposed between said inner switch and said PDSN providing an interface to said PDSN and handling all public data calls to and from said mobile station; and
   a private radio packet interface disposed between said inner switch and said intranet providing an interface to said intranet and handling all private data calls to and from said mobile station.

6. A base station controller (BSC), handling all calls to and from a wireless mobile station, including calls using a public mobile communications network and calls using a private mobile communications network and including voice calls and data calls, said base station controller comprising:
   an inner switch enabling inter-processor communications (IPCs) between a mobile station and a public and a private mobile communications networks;
   a public-used transcoder/MSC link interface disposed between said inner switch and an MSC disposed in a PLMN to provide voice calls to and from said mobile station using said public mobile communications network;
   a local-used transcoder/MSC link interface disposed between said inner switch and a PBX to provide voice calls to and from said mobile station using said private mobile communications network;
   a BTS link interface connected to a BTS, said BTS being in wireless communication with said mobile station; and
   a controller processing all calls to and from said mobile station, said BSC being adapted to handle all calls to and from the mobile station, including calls using the public mobile communications network and calls using the private mobile communications network and including voice calls and data calls.

7. The BSC of claim 6, the controller comprises:
   a public call process module processing all calls to and from said mobile station that use said public mobile communications network;
   a private call process module processing all calls to and from said mobile station that use said private mobile communications network;
   a private home location register (HLR) module managing information about subscribers registered in the private mobile communications network;
   a private MSC module connected to the private HLR, the private MSC module enabling an interworking with the PBX; and
   a message routing module performing a routing process for all calls to and from said mobile station.

8. The BSC of claim 6, said BSC further comprising:
   a local-used radio packet interface disposed between an intranet and said inner switch to provide data calls to and from said mobile station that use said private mobile communications network, said intranet being part of said private mobile communications network; and a public-used radio packet interface disposed between said inner switch and a PDSN to provide data calls between said mobile station that use said public mobile communications network, said PDSN being part of said public mobile communications network.

9. The BSC of claim 8, said intranet being connected to the Internet enabling said mobile station to access the Internet via said private mobile communications network.

10. The BSC of claim 6, said PBX being connected to a PSTN enabling said mobile station to access said PSTN via said private mobile communications network.

11. The BSC of claim 6, said private-used transcoder/MSC link interface being connected to said PBX via a LAN connection.

12. The BSC of claim 6, public-used transcoder/MSC link interface being connected to said MSC via a connection selected from the group consisting of an E1 connection and a T1 connection.

13. The apparatus of claim 1, wherein all calls from said mobile station to said public mobile communications network are routed through said MSC.

* * * * *